No. 752,808. PATENTED FEB. 23, 1904.
M. A. STEWART.
GRASS HOOK.
APPLICATION FILED JAN. 15, 1903.
NO MODEL.

WITNESSES:

INVENTOR
M. A. Stewart.
BY
P. F. Bourne
his ATTORNEY

THE NORRIS PETERS CO., PHOTO-LITHO., WASHINGTON, D. C.

No. 752,808. Patented February 23, 1904.

UNITED STATES PATENT OFFICE.

MATTHEW A. STEWART, OF NEW YORK, N. Y.

GRASS-HOOK.

SPECIFICATION forming part of Letters Patent No. 752,808, dated February 23, 1904.

Application filed January 15, 1903. Serial No. 139,119. (No model.)

*To all whom it may concern:*

Be it known that I, MATTHEW A. STEWART, a citizen of the United States, and a resident of New York city, borough of Manhattan, New York, have invented certain new and useful Improvements in Grass-Hooks, of which the following is a specification.

The object of my invention is to provide a snath or handle adapted to be detachably connected with the handle of a grass-hook or sickle and to be adjusted to various angles with respect to the grass-hook, whereby the grass-hook may be operated by a person in a standing position to avoid the necessity of stooping or bending down to reach the grass or the like to be cut; and to these ends my invention contemplates the novel details of improvement that will be more fully hereinafter set forth and then pointed out in the claims.

Reference is to be had to the accompanying drawings, forming part hereof, wherein—

Figure 1:
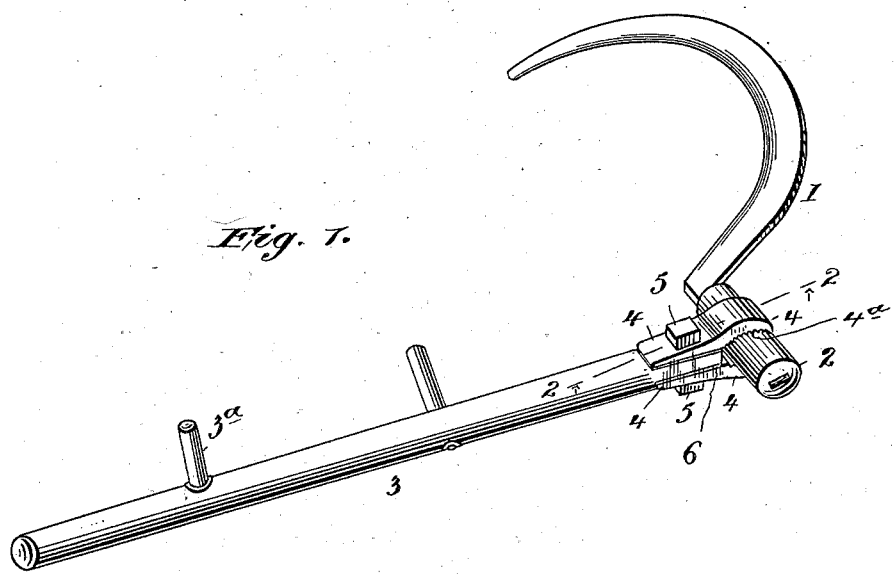
Figure 2:
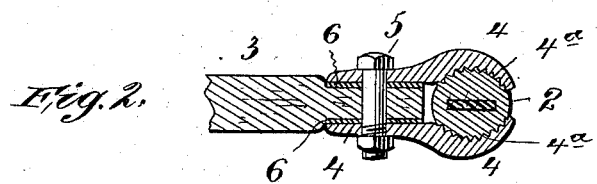
Figure 3:
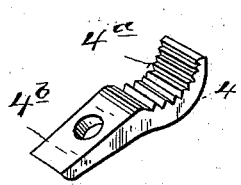
Figure 4:
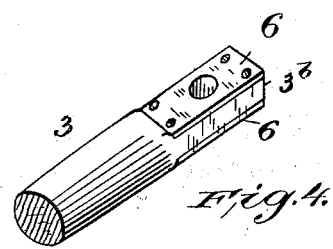

Figure 1 is a perspective view of a grass-hook provided with my improved snath. Fig. 2 is a detail section, enlarged, on the line 2 2 in Fig. 1. Fig. 3 is a perspective view of one of the clamps for holding the grass-hook handle to the snath, and Fig. 4 is a detail view of the lower end of the snath.

Similar numerals of reference indicate corresponding parts in the several views.

The numeral 1 in the accompanying drawings indicates generally a grass-hook provided with a wooden handle 2 in well-known manner, and 3 indicates a snath or long handle adapted to be detachably connected with the handle 2 of the grass-hook, the snath 3 being provided with handles or pegs $3^a$, secured thereto in suitable manner to be grasped by the operator.

The means I have shown for securing the snath 3 to handle 2 of the grass-hook comprise a clamp having a pair of jaws 4, the inner faces of which near their outer ends are curved to partially encircle the handle 2 and are preferably provided with serrations or teeth $4^a$ to sink into the handle 2, so as to more firmly grip the same, and the opposite ends of said jaws 4 on their inner faces are flattened, as at $4^b$, to rest upon the opposite flattened faces $3^b$ at the end of the handle 3. A bolt or screw 5 passes through alined apertures in the jaws 4 and the adjacent end of the snath for firmly clamping the jaws to the snath and the jaws upon the handle 2. I may interpose metal plates 6 between the end of snath 3 and the jaws 4 to prevent the jaws from producing wear on the snath and to keep the jaws from crushing the end of the snath when it is made of wood.

The meeting faces $4^b$ of the jaws 4 and the corresponding end of snath 3 or the plate 6 are shown as made flat to permit the snath 3 to be adjusted at an angle with respect to the jaws, and thereby at an angle with respect to the grass-hook handle 2. The adjustability of the jaws 4 with respect to and around handle 2 also permits the snath to be adjusted at upwardly-disposed angles with respect to the cutting position of the grass-hook to accommodate the position of the parts for different users.

By means of my improvements an ordinary grass-hook may be readily adjusted to the snath 3 at a convenient angle with respect to the same, and the handle 2 can be firmly held to said snath by the jaws 4, so that a person can use the grass-hook conveniently while in a standing position after the manner of the scythe without the necessity of stooping or bending, as is customary with the use of grass-hooks. The grass-hook can of course be used detached from the snath in the ordinary manner when required.

The details of construction shown and described may be varied without departing from the spirit of my invention.

Having now described my invention, what I claim is—

1. The combination of a grass-hook provided with a handle, a snath having a pair of jaws secured to its lower end and projecting therebeyond, the opposite projecting portions of said jaws being curved and provided with serrations or teeth to receive and grip firmly said handle, and means for detachably securing said jaws upon said handle whereby the snath may be adjusted to different positions with respect to the grass-hook, substantially as described.

2. The combination of a grass-hook provided with a handle, with a snath having a pair of jaws at one end to grip said handle, the inner portions of said jaws resting on opposite sides of the snath and being provided with flat faces to coact with corresponding faces of the snath to permit adjustment of the snath at angles with respect to said handle, and means for detachably holding said jaws upon said snath, substantially as described.

MATTHEW A. STEWART.

Witnesses:
H. B. BRADBURY,
T. F. BOURNE.